United States Patent Office 3,484,470
Patented Dec. 16, 1969

3,484,470
BIS-(FLUOROALKOXY) ALKYLSILANES
Allen G. Pittman, El Cerrito, and William L. Wasley, Berkeley, Calif., assignors to the United States of America as represented by the Secretary of Agriculture
No Drawing. Original application Mar. 16, 1967, Ser. No. 623,527. Divided and this application Apr. 17, 1968, Ser. No. 736,882
Int. Cl. C07f 7/12, 7/18
U.S. Cl. 260—448.2     4 Claims

ABSTRACT OF THE DISCLOSURE

The adduct of hexafluoroacetone and an alkali metal fluoride, e.g., $(CF_3)_2CF-OK$, is reacted with a 1,4-dihalo-2-butene to replace the halo groups with perfluoroisopropoxy groups. A silane containing H bonded to Si—for example, $HSiCl_3$—is then added across the double bond of the intermediate, producing bis-(perfluoroisopropoxy)alkyl silane derivatives which are useful, in both monomeric and polymeric form, for imparting a high degree of water- and oil-repellency to fibrous substrates, e.g., fabrics made from natural or synthetic fibers.

---

This is a division of our application Ser. No. 623,527, filed Mar. 16, 1967, now Patent 3,420,793.

A non-exclusive, irrevocable, royalty-free license in the invention herein described, throughout the world for all purposes of the United States Government, with the power to grant sub-licenses for such purposes, is hereby granted to the Government of the United States of America.

Various intermediates used in the preparation of the compounds of the invention are described in one or more of our copending applications listed in the following table. Specific references will be made to these applications hereinbelow.

Ser. No. 398,129, Sept. 21, 1964, Patent 3,384,628; Ser. No. 433,818, Feb. 18, 1965, Patent 3,382,222; Ser. No. 457,533, May 20, 1965, pending; Ser. No. 526,348, Feb. 10, 1966, Patent 3,422,131; Ser. No. 526,366, Feb. 10, 1966, abandoned; Ser. No. 526,378, Feb. 10, 1966, Patent 3,331,813.

This invention relates to and has among its objects the provision of new organic compounds, namely, bis-(fluoroalkoxy)alkyl silanes, or more particularly, bis-(perfluoroisopropoxy)alkyl silanes, in both monomeric and polymeric form. The objects of the invention also include methods for synthesizing these compounds, procedures for treating fibrous materials with the compounds, and the treated materials as new articles of manufacture. Further objects of the invention will be evident from the following description wherein parts and percentages are by weight unless otherwise specified.

Note.—In the following description, the perfluoroisopropyl radical

(also known as the heptafluoroisopropyl radical), will be designated by the symbol Q. For the sake of brevity, the symbol Q will be used in the various formulae following the introductory description of the products of the invention.

The fact that various organic siloxanes confer water-repellency on substrates is well known and, indeed, these compounds are used extensively to render ceramics, masonry, and fibrous materials water-repellent. In many instances, water-repellency alone is not sufficient; oil-repellency is also required. This is the case, for example, where the treatment is intended to confer resistance to soils and stains. Since these may involve oil-borne as well as water-borne soiling components, both types of repellency are essential. The known organo-siloxanes do not yield an effective level of oil-repellency and thus do not provide the desired protection from oil-borne soils. Many attempts have been made in the art to provide siloxane compositions which provide the requisite dual repellency but invariably these attempts have failed by reason of ineffectiveness of one form of repellency or the other or even virtual cancellation of both.

It is, therefore, a prime object of the invention to provide novel compounds which are useful to provide substrates with a high degree of both water- and oil-repellency.

The new compounds

The novel monomers of the invention have the structure:

(I)
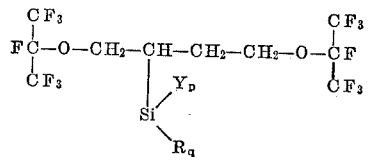

wherein:

Y is a member of the group consisting of halogen, alkoxy, aroxy, and acyloxy radicals,
R is a member of the group consisting of hydrogen, monovalent hydrocarbon radicals, and monovalent halo-hydrocarbon radicals,
$p$ is an integer from 1 to 3.
$q$ is an integer from 0 to 2, and
the sum of $p$ and $q$ is 3.

Referring to the above formula, examples of values for the various symbols are given below by way of illustration and not limitation:

Y may be a halogen such as fluorine, chlorine, bromine, or iodine; an alkoxy radical such as methoxy, ethoxy, isopropoxy, propoxy, butoxy, cyclohexyloxy, or the like; an aroxy radical such as phenoxy, toloxy, ethylphenoxy, isopropylphenoxy, or the like; or an acyloxy radical such as acetoxy, propionoxy, butyroxy, benzoxy, or the like.

Examples of R are hydrogen; an alkyl radical such as methyl, ethyl, propyl, isopropyl, butyl, cyclohexyl, methylcyclohexyl, etc.; an aryl radical such as phenyl, tolyl, ethylphenyl, isopropylphenyl, xylyl, xenyl, naphthyl, etc.; an aralkyl radical such as benzyl or 2-phenylethyl; or a halogenated hydrocarbon radical such as 2-chloroethyl, trifluoromethyl, 3 - chloropropyl, 2,2,2 - trifluoroethyl, 4-chloro-(or fluoro-)cyclohexyl, p-chloro- (or bromo- or fluoro-)penyl, and the like.

A particularly critical aspect of the compounds of the invention is the presence of the heptafluoroisopropyl radical (II)

and especially in the fact that it contains a fluorine group in alpha position, that is, on the secondary carbon (marked by an asterisk in Formula II, above). The unique structure of this radical provides the advantage that it confers a greater degree of oleophobicity for a given number of fluorinated carbon atoms than with other arrangements of fluorinated carbon atoms in straight chains, or even in branched chain structures which do not include the alpha-fluoro arrangement. In fact, our investigations have shown that three fluorinated carbon atoms in our arrangement provide a degree of oleophobicity equivalent to 6 or 7 fluorinated carbon atoms in a straight chain or other structure which lacks the critical alpha-fluoro configuration.

A further critical point of the compounds of the invention is that they contain two of the heptafluoroisopropyl groups per molecule, whereby the compounds are outstandingly effective in conferring oleophobic properties to fibrous materials such as textiles treated therewith. Another important aspect of the invention is that the

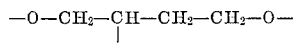

portion of the compounds provides effective isolation of the perfluoroisopropyl groups from the silyl group. As a result, the compounds are stable and will undergo typical polymerization reactions, unaffected by the fluorine-containing "tail." Accordingly, the compounds can be converted into various polymeric derivations useful for a wide variety of uses, including the treatment of textiles and other fibrous materials. A further important point is that the aforesaid bridging group, containing only four carbon atoms, does not annul the oleophobic effect of the heptafluoroisopropyl groups. Thus when the polymers of the invention are applied to (or formed on) textiles or other fibrous materials, the fluorinated groups are still relatively close to the polymer backbone, whereby they can provide a high degree of oleophobicity to the treated fibrous substrate.

Considering now the silyl portion of the compounds, Y represents a radical which confers reactivity, e.g., it enables the compounds to be polymerized and/or to chemically combine with substrates to which the compounds are applied. Particularly preferred for Y are chlorine or lower alkoxy such as mtehoxy or ethoxy. Moreover, it is preferred that the number of Y groups be two or three (i.e., that $p$ be 2 to 3) since such compounds are polymerizable. As to the radical R: When this radical is present (that is, when $q$ is 1 or 2) the preferred embodiments are hydrogen or a simple hydrocarbon radical such as methyl, ethyl, or phenyl.

Taking the above considerations into account, the compounds of the invention which are particularly preferred for use (in monomeric or polymeric form) in the treating of textiles and other fibrous substrates, are those responding to any of the following alternative structures:

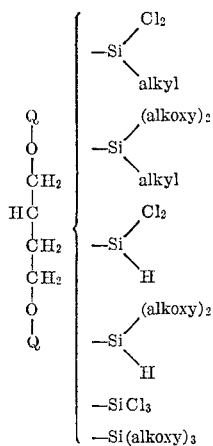

As noted hereinabove, the symbol Q, as used above and henceforth, stands for the perfluoroisopropyl radical.

Preparation of the new compounds (A) In preparing the compounds of the invention, 1,4-dichloro-2-butene (or the corresponding dibromo compound) is reacted with an adduct of hexafluoroacetone and an alkali metal fluoride to produce 1,4-bis-(heptafluoroisopropoxy)-2-butene. This step of the synthesis may be readily visualized from the following equation, wherein M represents an alkali metal:

Cl—CH$_2$—CH=CH—CH$_2$—Cl + 2Q—OM ⟶
        Q—O—CH$_2$—CH=CH—CH$_2$—O—Q + 2MCl

It is evident from the foregoing formulas that the synthesis is a simple etherification involving replacement of the halo groups by the heptafluoroisopropoxy groups and elimination of alkali metal halide. The desired etherification is accomplished simply by contacting the reactants. The temperature at which the reaction is conducted is not a critical factor and may vary, for example, from 20 to 150° C. Generally, temperatures of about 70 to 100° C. are preferred to increase the rate of reaction, yet without danger of decomposition. To avoid hydrolysis of the reactants, particularly the adduct, the reaction is carried out under anhydrous conditions. To attain good contact between the reactants it is preferred to employ an inert solvent as, for example, acetonitrile, tetrahydrofuran, tetramethylene sulphone, dimethyl ether of diethylene glycol, etc. After completion of the reaction, the product may be separated by dropping the reaction mixture into an excess of water, separating the organic material and subjecting it to distillation under reduced pressure.

As explained above, one of the reactants in the synthesis is an adduct of hexafluoroacetone and an alkali metal fluoride. This adduct—which may also be termed an alkali metal heptafluoroisopropylate—may be readily prepared by reacting hexafluoroacetone with an alkali metal fluoride, such as sodium, cesium, or potassium fluoride, as disclosed in our copending application Ser. No. 398,129, filed Sept. 21, 1964. Preparation of the adduct is also illustrated herein in Example 1.

(B) In the next step of the synthesis the above-described intermediate—1,4-bis-(heptafluoroisopropoxy)-2-butene—is reacted with a silane containing hydrogen bonded directly to the Si atom, whereby to achieve a chemical addition. A typical application of this step, using trichlorosilane as the silane reactant, is illustrated as follows—

(III) Q—O—CH$_2$—CH=CH—CH$_2$—O—Q + HSiCl$_3$ ⟶
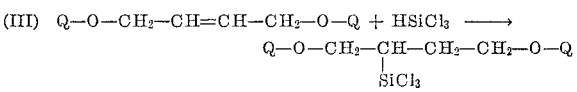

The process is by no means limited to the above example. Generically, the silane reactant may be any compound responding to the formula—

wherein Y, R, $p$, and $q$ are as above defined.

Illustrative examples of the silane reactant are: trichlorosilane; tribromosilane; dichlorosilane; dibromosilane; alkyldihalosilanes such as methyldichlorosilane, butyldichlorosilane, cyclohexyldichlorosilane, etc.; dialkylhalosilanes such as dimethylchlorosilane, diethylchorosilane, and dicyclohexylchlorosilane; aryldihalosilanes and diarylhalosilanes such as phenyldichlorosilane and diphenylchlorosilane; aralkylhalosilanes such as benzyldichlorosilane and dibenzylchlorosilane; silanes containing halohydrocarbon substituents such as β-chloroethyldichlorosilane, 4-chlorocyclohexyldichlorosilane, p-chlorophenyldichlorosilane, 3,3,3-trifluoropropyldichlorosilane, etc.; silanes containing alkoxy groups such as methyldiethoxysilane, i.e., CH$_3$HSi(OC$_2$H$_5$)$_2$, triethoxysilane, i.e., HSi(OC$_2$H$_5$)$_3$ diethoxysilane, i.e., H$_2$Si(OC$_2$H$_5$)$_2$, dicyclohexyloxysilane, phenyldiethoxysilane, and the like.

It is evident from the foregoing formulas that the synthesis involves a simple addition of the silane to the unsaturated group of the intermediate, the hydrogen of the silane adding to one carbon of the unsaturated pair, the remainder of the silane to the other carbon of said pair. This addition may be carried out over a wide range of temperatures, varying from room temperature to 450° C., and pressures ranging from ambient pressure to 100 or more atmospheres, using free-radical catalysts, such as benzoyl peroxide, t-butyl perbenzoate, azo-bis-isobutyronitrile; metals or metal salts such as platinum, palladium, ruthenium chloride, potassium chloroplatinate, or platinum on charcoal or asbestos; organic bases such as triethylamine, pyridine, or piperidine; acid catalysts such as chloroplatinic acid or boron trifluoride. In the alternative, the addition may be effected with U.V. initiation or simply by heating to high temperatures in the absence of a catalyst.

In a typical application, the addition is carried out by heating the reactants in the presence of a catalytic proportion of chloroplatinic acid and the addition product is isolated by distillation. Generally, the addition is carried out at a temperature of about 60 to 120° C. when a catalyst such as chloroplatinic acid is employed. The optimum temperature in any particular case will depend on the catalyst employed. For example, the addition can be conducted at room temperature with U.V. initiation. In the alternative, the addition may be conducted in the absence of any catalyst, at temperatures of 250–450° C. and under autogenous pressure in a sealed vessel such as an autoclave. The addition may be carried out in the presence of inert solvents such as carbon tetrachloride or benzene but these are not usually necessary.

Regarding the compounds of the invention wherein Y is alkoxy or aroxy, these may be prepared directly, for example, employing in the addition a hydrosilane containing an alkoxy or phenoxy group. Usually, however, it is preferred to apply the addition to a hydrosilane containing halogen (for instance, $HSiCl_3$ or $CH_3SiCl_2$). The resulting addition product is then contacted with an anhydrous alcohol or phenol in the presence of an HCl-acceptor such as pyridine or dimethylaniline to yield the desired alkoxy or aroxy derivative. A typical synthesis in this area is the conversion of the trichlorosilane derivative to the corresponding trimethoxysilane derivative.

In some cases, these derivatives (e.g., alkoxides) are preferred over the corresponding chlorosilanes since they do not release HCl when contacted with substances containing active hydrogen (as in OH, $NH_2$ and like groups). Thus, in applications to various substrates, use of the alkoxides avoids any possibility of damage to the substrate.

Regarding the compounds of the invention wherein Y is an acyloxy radical—e.g., acetoxy—these are preferably prepared from the corresponding di- or trichlorosilane derivatives by reaction with an acid anhydride, such as acetic anhydride. For example, a mixture of the di- or tri-chlorosilane derivative and acetic anhydride is boiled for a few hours or allowed to stand at room temperature for a longer period, and the acetyl chloride (by-product) is distilled off. Alternatively, the acetyl chloride may be removed continuously as it is formed.

Uses of the compounds

The compounds of the invention are generally useful as intermediates for various syntheses. For example, they may be employed to form useful polymers. In addition, the compounds of the invention are useful directly in treating fibrous substrates as explained in more detail below.

Preparation of polymers

The monomers of the invention containing 2 to 3 hydrolyzable groups (that is, where $p$ is 2 or 3) are polymerizable and come into special consideration. These compounds—herein designated as di- and tri-functional monomers for simplicity of reference— can be formed into homopolymers or copolymers by standard hydrolytic polymerization techniques used with simple chlorosilanes and alkoxysilanes. Typically, the polymerization is effected by stirring the di- or tri-functional monomer with an excess of water. Linear polymers may be prepared by applying this polymerization to a single di-functional monomer or a mixture of different difunctional monomers.

Thus, for instance, one may polymerize the methyldichlorosilane derivative—

(IV) 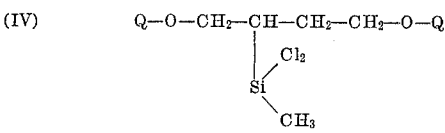

to yield a linear polymer containing the following repeating unit—

(V) 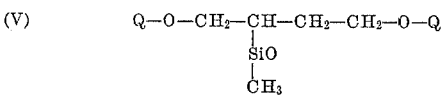

Generally, the linear polymers derived from the di-functional monomers of the invention are liquids, of a syrupy consistency, poorly soluble in common solvents such as benzene and toluene but readily soluble in fluorinated solvents such as benzotrifluoride, 1,3-bistrifluoromethyl benzene, or trichlorotrifluoroethane.

The polymerizable monomers described herein may be copolymerized with known polymerizable silanes, as, for example, dimethyldichlorosilane, diphenyldichlorosilane, methyldichlorosilane, methyltrichlorosilane, methyl di-(or tri-)ethoxysilane, trichlorosilane, and the like.

Among the preferred types of polymers are those containing hydrogen attached to silicon. These can be prepared in various ways. For example, a di-functional monomer where R is hydrogen may be polymerized by itself or with a different polymerizable silane. In the alternative, the Si—H group may be derived from the co-monomer. Thus, for example, a di-functional monomer wherein R is hydrocarbon may be copolymerized with a known polymerizable monomer containing an Si—H grouping, e.g., tri-chlorosilane, methyl dichlorosilane, butyldichloro silane, phenyl dichlorosilane, methyldiethoxysilane, phenyldiethoxysilane, or the like. These polymers containing H bonded to Si have the advantage that when applied to a fibrous material—such as one of proteinous or cellulosic nature—and subjected to a conventional cure, there occurs an especially good bonding of the polymer to the substrate. The bonding not only occurs by reaction of terminal (unhydrolyzed) radicals in the polymers with reactive sites in the substrate but also by reactions of such sites with the reactive group presented by the hydrogen directly attached to Si. Beyond the use in application to substrates, the polymers containing Si—H groupings can be formed into rubbery materials, useful, for example, in preparing solvent-resistant gaskets and sealing compositions. In preparing such rubbers, the polymer produced in the usual hydrolytic polymerization is heated, for example, at 100–200° C. in air with or without a peroxide catalyst whereby a cross-linking takes place, resulting in formation of a rubber, insoluble in common solvents but swellable in fluorinated solvents such as 1,3-bis-(trifluoromethyl)benzene.

Cross-linked polymers can be prepared by polymerizing the tri-functional monomers alone, or co-polymerizing them with a different tri-functional or di-functional monomer. Typical in this area are: (a) The homopolymerization of the trichlorosilane derivative (shown above in Formula III) to produce a polymer containing a repeating unit of the structure—

(VI) 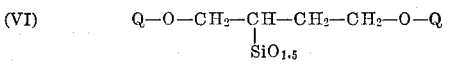

(b) The co-polymerization of the aforesaid tri-functional derivative with another tri-functional silane such as trichlorosilane, or (c) with a di-functional silane such as dichlorosilane, dimethyldichlorosilane, or any of the di-functional monomers herein described, e.g., the monomer shown above in Formula IV. Moreover, cross-linked polymers may also be prepared from the di-functional monomers of the invention by co-polymerizing them with known tri-functional silanes such as trichlorosilane, trimethoxysilane, methyltrichlorosilane, phenyltrichlorosilane, or the like.

These copolymers may be prepared by dissolving the appropriate monomers in an inert solvent and stirring the solution with an excess of water. The syrupy copolymer which is formed can then be cured to an insoluble rubbery polymer by heating in air at about 100–200° C.

The polymers which may be produced from the di- and tri-functional monomers of the invention may vary in composition over a wide range. For instance, the polymers derived from one or more di-functional monomers will contain repeating units of the formula—

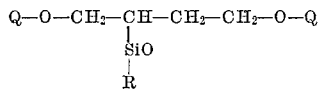

wherein R is as above defined.

At the opposite extreme, the polymers derived from one or more of the tri-functional monomers will contain repeating units of the structure—

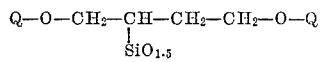

However, the invention also includes copolymers of the di- and tri-functional monomers so that, generically, the polymers ranging from those derived from di-functional monomers, through those derived from mixtures of di- and tri-functional monomers, and including those derived from tri-functional monomers, may be considered as containing repeating units of the following average general formula:

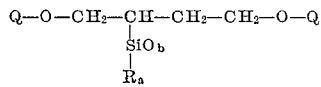

wherein R is as above defined and
wherein $a$ has an average value from 0 to 1,
$b$ has an average value from 1 to 1.5, and
the sum of $a+2b$ is 3.

In any of the polymerizations described above, the chain length of the polymer can be limited by adding to the polymerization mixture a mono-functional monomer, as, for example, a dimethylchlorosilane derivative, which acts as a chain-stopper.

The polymerizable monomers described herein may also be copolymerized with the polymerizable silanes disclosed in our pending applications Ser. Nos. 526,348, 526,366, and 526,378, each filed Feb. 10, 1966, namely, silanes of the structure—

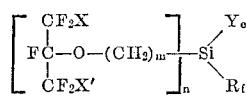

wherein:

X and X' are each halogen,
Y is a member of the group consisting of halogen, alkoxy, and aroxy,
R is a member of the group consisting of hydrogen, monovalent hydrocarbon radicals, and monovalent halohydrocarbon radicals,
$m$ is an integer from 2 to 3,
$n$ is an integer from 1 to 2,
$e$ is an integer from 2 to 3,
$f$ is an integer from 0 to 1, and
the sum of $n$, $e$ and $f$ is 4.

Especially preferred in this connection is the copolymerization of the polymerizable monomers of the present invention with those of the aforesaid applications which have any of the following alternative structures:

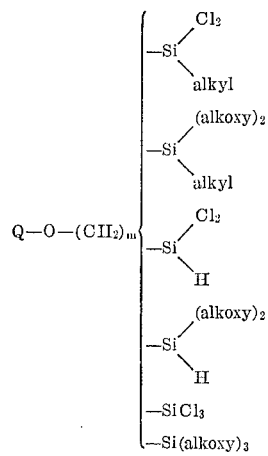

wherein $m$ is an integer from 2 to 3.

Treatment of fibrous substrates

The compounds described herein are particularly useful for the treatment of fibrous materials, such as textiles, in order to improve their properties, e.g., to improve their oil-, water-, and soil-repellency. In practicing this phase of the invention, a polymer is prepared as described above and applied to the fibrous material. The polymer may be a homopolymer, that is, one consisting of recurring units of a di-functional monomer or a tri-functional monomer. Moreover, it may be a copolymer, that is, a polymer containing recurring units of one di-functional monomer interspersed with recurring units derived from one or more different di-functional monomers and/or one or more tri-functional monomers. The co-monomers may, for example, be known silanes such as methyldichlorosilane, dimethyldichlorosilane, methyltrichlorosilane, trichlorosilane, phenyldichlorosilane, and the like, or, they may be any of the polymerizable monomers described in the aforesaid applications Ser. Nos. 526,348, 526,366, and 526,378. The polymers (homo- or co-polymers) are applied to the fibrous material in conventional manner. Typically, the polymer is dissolved in an inert volatile solvent, e.g., benzotrifluoride, 1,3-bis-trifluoromethyl benzene, or trichlorotrifluoroethane. The resulting solution is applied to the fibrous material by a conventional dip and pad technique. By varying the concentration of the polymer in solution and the degree of padding, the amount of polymer deposited on the material may be varied. Typically, the amount of polymer may be from 0.1 to 20%, based on the weight of fibrous material but it is obvious that higher or lower proportions can be used if desired. Usually, in treating textiles such as fabrics, the amount of polymer is limited to about 0.1 to 5% to attain the desired repellency without interference with the hand of the textile. In an alternative procedure, the polymers are applied to the fibrous material in the form of an aqueous emulsion.

After application of the polymer solution, the treated fibrous substrate is subjected to a conventional curing operation in order to bond the polymer to the fibers. As an example of such treatment, the fibrous material is heated in the range of about 50 to 150° C. for a period of 5 to 60 minutes. The solvent (from the polymer solution) may be evaporated in a separate step prior to curing or it may simply be evaporated during the curing operation. In this curing operation the uncondensed or unhydrolyzed groups in the uncured polymer (e.g., halo, alkoxy, or aroxy groups attached to Si) react with reactive sites in the fibers, particularly sites which contain active hydrogen as in hydroxyl, primary and secondary amide, thiol, carboxyl, and like groups. Many types of fibers—for example: wool, silk, hair, and other proteinous fibers; cotton, rayons, and other cellulosic fibers; nylon, polyurethane, and polyures fibers—contain groups of this kind and therefore are particularly suitable substrates to obtain good bonding of the polymer deposit. Moreover, virtually all fibrous materials, even inorganic products such as asbestos and glass fibers, contain moisture and during the curing operation this moisture promotes additional hydrolysis and condensation of unreacted Si-bonded halo, alkoxy, or aroxy groups with the end result that additional, in situ, polymerization occurs so that the polymer is durably fixed to the treated substrate.

If it is desired to expedite the curing operation, a conventional curing catalyst may be added to the polymer solution before application to the fibrous substrate or the catalyst may be separately deposited on the substrate before or after application of the polymer solution. Typically, one may use such catalysts as zinc octoate, dibutyltin diacetate or dilaurate, triethanolamine titanate, triethanolamine zirconate, zirconium acetate, zirconium oxychloride, zirconium or titanium esters of alkanols such as tetrabutyl titanate, zinc perfluorobutyrate, etc.

Fibrous materials treated with the polymers of the invention display an enhanced resistance to becoming soiled because they repel both water- and oil-borne soils and stains. Particularly important in conferring high resistance to soiling by oily materials is the fluorinated isopropyl moiety of the polymers, most importantly the fact that there is a fluorine in the alpha position (the secondary carbon atom). Another significant point is that the enhancement of soil repellency is attained without detriment to other properties of the textile. In particular, the treatment does not impair the hand of the textile. In fact, the hand is usually improved in that the textile is softer and more supple. Another point is that the improvements rendered by the process are durable—they are retained despite laundering and dry-cleaning of the product. Although the preformed polymers are usually applied to the fibrous material, the monomers may be applied as such in the form of a vapor, in the pure liquid form, or from solution in an inert volatile solvent. On application of the monomers to the fibrous material, reactions take place whereby the applied compound is bonded to the fibers. This bonding is believed to occur through reaction of the reactive groups of the monomer (Y in Formula I, above) with the reactive sites in the fibers, particularly sites which contain active hydrogen as in OH, NH$_2$—, —NH—, and similar groups. It is also believed that concomitantly, polymerization of the monomer occurs in situ on the fibers, such polymerization being promoted by the moisture naturally present in all fibrous materials. To promote the bonding of the monomer and the in situ polymerization thereof, it is preferred to cure the treated fibrous substrate, for example, at 50–150° C. for 5 to 60 min.—after application of the monomer. To expedite the curing operation, one may add a conventional curing catalyst such as those listed above.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylonitrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts or other non-woven fabrics, garments or garment parts.

EXAMPLES

The invention is further demonstrated by the following illustrative examples. The various tests described in the examples were carried out as described below:

Water Repellency: AATC spray test, method 22–1952. Ratings are from 0 to 100, with the higher values signifying greater resistance to water penetration.

Oil Repellency: The test used was the AATC Tentative Test Method 118–1966T. Ratings are from 0 to 8 with the higher values signifying the greater resistance to oil penetration. In particular, the oil-repellency rating is the highest-numbered test liquid which will not wet the fabric within a period of 30 seconds. The liquids and their corresponding numbers are:

| No.: | Composition |
|---|---|
| 1 | "Nujol." |
| 2 | 65:35 "Nujol"; n-hexadecane by vol. |
| 3 | n-Hexadecane. |
| 4 | n-Tetradecane. |
| 5 | n-Dodecane. |
| 6 | n-Decane. |
| 7 | n-Octane. |
| 8 | n-Heptane. |

Example 1.—Preparation of

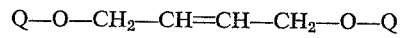

(hereinafter referred to as Olefin-A)

Into a 1-liter, 3-necked flask, equipped with a Dry Ice condenser, gas-inlet tube, and stirring bar, was placed 59 g. (1.03 mole) anhydrous KF, followed by 200 ml. of dry N,N-dimethylformamide. The condenser was cooled with Dry Ice and 171 g. (1.03 mole) of hexafluoroacetone was introduced at such a rate that the gas-condensate dripped slowly from the condenser. After the addition, a clear solution of the hexafluoroacetone—KF adduct

Q—OK resulted. Then, 50 g. (0.4 mole) of 1,4-dichloro-2-butene was added in one shot. The Dry Ice condenser was replaced with a water condenser and the mixture was stirred and heated at 75° C. for 91 hours. At the end of this time, the reaction mixture was cooled to room temperature and then poured into 500 ml. of an ice-water mixture. The lower fluorocarbon layer was recovered and washed several times to remove solvent. One hundred and forty-seven grams (86.7% crude yield) of product was collected. Distillation yielded 121 grams of purified product, B.P. 57° C./10 mm. (155°/760 mm.), $N_D^{24}$ 1.3130.

The infrared scan of the product showed the expected olefin absorption at 5.8 microns. The NMR spectra was in accordance with the structure indicated.

Example 2.—Preparation of

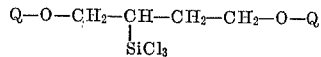

(hereinafter referred to as TCS)

Four thick-walled glass tubes, sealed at one end, were each charged with the following:

| | Ml. |
|---|---|
| Olefin-A | 4 |
| Trichlorosilane | 4.5 |
| t-Butyl perbenzoate | 0.2 |

The tubes were cooled in Dry Ice and sealed and placed in an oil bath at 100° C. for 12 hours. Distillation of the combined contents of the tubes yielded a fraction of unreacted Olefin-A; 4 g. of a fraction, B.P. 78–85° C./1.5 mm., which, by gas chromatographic analysis, was a mixture of the unreacted Olefin-A and TCS; and then a 12-gram fraction, B.P. 86–88° C./1.5 mm., $N_D^{24}$ 1.3532. This last fraction did not show the presence of unreacted olefin by chromatographic analysis, indicating it was the desired product, TCS.

The infrared and NMR spectra confirmed the proposed structure.

Example 3.—Examination of catalyst activity in the addition of trichlorosilane to Olefin-A Four Pyrex tubes sealed at one end were each charged with 0.5 ml. Olefin-A, 0.6 ml. trichlorosilane, and the following catalysts:

Tube 1—.04 ml. t-butylperbenzoate
Tube 2—0.1 ml. of a 0.15 molar solution of $H_2PtCl_6 \cdot 6H_2O$ in isopropanol
Tube 3—.01 ml. of a 0.14 molar solution of $H_2PtCl_6 \cdot 6H_2O$ in isopropanol
Tube 4—100 mg. $\alpha,\alpha'$-azobisisobutyronitrile The tubes were sealed. Tubes 1, 2, and 3 were heated at 100° C. for 12 hours. Tube 4 was heated at 75° C. for 12 hours. After heating, the tubes were opened and volatiles removed under a 1–2 mm. vacuum at room temperature. The residues were analyzed by gas chromatography to give the following yields of TCS:

| Tube No.: | Yield of TCS, Percent |
|---|---|
| 1 | 58 |
| 2 | 58 |
| 3 | 28 |
| 4 | 20 |

Example 4.—Preparation of

Q—O—CH$_2$—CH—CH$_2$—CH$_2$—O—Q

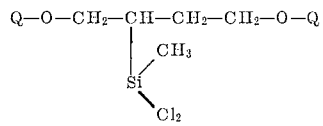

(hereinafter referred to as MDS)

Four Pyrex tubes, sealed at one end were each charged with the following:

| | Ml. |
|---|---|
| Olefin-A | 4 |
| Methyl dichlorosilane | 4.5 |
| t-Butylperbenzoate | 0.2 |

The tubes were cooled in Dry Ice, sealed and placed in an oil bath at 100° C. for 15 hours. Distillation yielded the product, B.P. 75–85° C./1.5 mm.

Example 5.—Polymerization of TCS

Two ml. of TCS (prepared as described in Ex. 2), were added slowly to 100 ml. water, stirred at high speed. After the addition, water was decanted from the thick polymeric residue and the polymer was washed with fresh water, then dissolved in approximately 20 ml. trichlorotrifluoroethane. The solution was washed twice with water, then placed on a steam bath to remove solvent. A clear, thick polymer remained which could be dissolved in fluorinated solvents but was relatively insoluble in non-fluorinated solvents. The polymer is believed to contain repeating units as shown above in Formula VI.

Example 6.—Co-polymerization of TCS and trichlorosilane (HSiCl$_3$)

A mixture of 2 ml. TCS, prepared as described in Ex. 2, and 0.3 ml. trichlorosilane was added dropwise to 100 ml. water stirred at high speed. The resulting polymer was worked-up in the same manner described in Ex. 5. A polymer was obtained which was solid at room temperature but could be made to flow at temperatures above 60° C. The polymer was soluble in fluorinated solvents and insoluble in non-fluorinated solvents. The polymer is believed to contain repeating units as shown above in Formula VI plus repeating units of the structure: $HSiO_{1.5}$.

Example 7.—Co-polymerization of TCS and 3-(heptafluoroisopropoxy)propyl trichlorosilane, i.e.:

Q—O—CH$_2$—CH$_2$—CH$_2$—SiCl$_3$

A mixture (1/1 volume basis) of the two trichlorosilane derivatives were hydrolyzed in an excess of water and worked-up in the manner described in Ex. 5. The polymer is believed to contain repeating units as shown above in Formula VI plus repeating units of the structure:

Q—O—CH$_2$—CH$_2$—CH$_2$—SiO$_{1.5}$

It was a clear, viscous, semi-solid which was soluble in fluorinated solvents but insoluble in non-fluorinated solvents.

Example 8.—Polymerization of MDS

The monomeric methyldichlorosilane derivatives, prepared as described in Ex. 4, was hydrolyzed in water and the polymer obtained in the same manner described in Ex. 5. The polymer is of linear character and has repeating units as shown above in Formula V. It is a clear, viscous liquid.

Example 9.—Application of polymer of TCS to fabric

The polymer prepared in Ex. 5 was dissolved in trichlorotrifluoroethane. Solutions containing 2.5%, 1.25%, and 0.62% were prepared and utilized in fabric treatment. Farics (wool and cotton) were wet-out with the polymer solutions, run through a squeeze roll to obtain an approximate 100% wet pick-up, air dried, then cured at 140–150° C. for 10 min. before testing for oil- and water-repellency. The following results were obtained:

| Concentration of polymer in solution, percent | Wool | | Cotton | |
|---|---|---|---|---|
| | Oil repellency | Water repellency | Oil repellency | Water repellency |
| 2.5 | 5 | 100 | 4 | 100 |
| 1.25 | 4 | 100 | 4 | 100 |
| 0.62 | 3 | 100 | 4 | 100 |
| 0 | 0 | 50 | 0 | 0 |

Example 10.—Application of copolymer of TCS and trichlorosilane to fabrics

Solutions of the copolymer, prepared as described in Example 6, were utilized in a series of fabric treatments. The solutions were prepared and applied as described in Example 9. The results are tabulated below:

| Concentration of polymer in solution, percent | Wool | | Cotton | |
|---|---|---|---|---|
| | Oil repellency | Water repellency | Oil repellency | Water repellency |
| 2.5 | 5 | 100 | 5 | 100 |
| 1.25 | 4 | 100 | 5 | 100 |
| 0.62 | 3 | 100 | 4 | 100 |
| 0 | 0 | 50 | 0 | 0 |

Example 11.—Application of copolymer of TCS and 3-(heptafluoroisopropoxy)propyl trichlorosilane to fabrics Solutions of the copolymer, prepared as described in Example 7, were utilized in a series of fabric treatments. The solutions were prepared and applied in the same manner as described in Example 9. The results are tabulated below:

| Concentration of polymer in solution, percent | Wool | | Cotton | |
|---|---|---|---|---|
| | Oil repellency | Water repellency | Oil repellency | Water repellency |
| 2.5 | 4 | 100 | 4 | 100 |
| 1.25 | 3 | 100 | 3 | 100 |
| 0.62 | 3 | 100 | 3 | 100 |
| 0 | 0 | 50 | 0 | 0 |

Example 12.—Application of polymer of MDS to fabrics

A 5% solution (in Cl$_2$FC—CClF$_2$) of the polymer described in Example 8 was applied to wool swatches in the same manner as described in Example 9. The treated wool displayed enhanced oil- and water-repellency.

Example 13.—Examination of the liquid-solid contact angles of glass coated with TCS A 2% solution of TCS (prepared as described in Ex. 2) in toluene was prepared. Glass slides were held in the solution for 10 sec., then withdrawn vertically and shaken to remove adhering droplets. The slides were then placed in an oven at 150° C. for 10 min. After cooling to room temperature, contact angle measurements were made of droplets of pure n-dodecane, n-nonane, and water on the treated slides. The contact angle is an inverse measure of the wettability of the surface, e.g., the larger the angle the less wettable is the surface. The results are tabulated below:

| Test liquid: | Contact angle, degrees |
|---|---|
| Water | 92 |
| n-Dodecane | 38.5 |
| n-nonane | 32 |

It is of interest to note that a drop of an alkane or water placed on an untreated slide will not form a distinct drop but will spread out in a continuous film, i.e., the contact angle is zero or expressed in other words, the surface is wetted by the liquid.

Example 14.—Reaction of TCS with methanol to form the trimethoxy derivative, and polymerization thereof The trimethoxy derivative

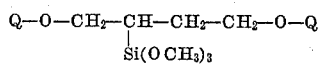

was prepared by adding TCS (produced as described in Example 2) to an excess of anhydrous methanol. Distillation gave the trimethoxy derivative.

Polymerization was effected by adding the trimethoxy derivative to an excess of water. A thick liquid polymer resulted which was not readily soluble in toluene but which was readily soluble in trichlorotrifluoroethane.

As noted above, the monomers of the present invention may be copolymerized with monomers described in our copending applications Ser. Nos. 526,348, 526,366, and 526,378. To provide an independent disclosure, the following examples illustrative of the syntheses of these latter monomers are included herein.

Example A.—Preparation of 3-(heptafluoroisopropoxy) propyl-trichlorosilane

The compound was prepared by heating the following ingredients in a sealed tube at 90° C. for 6 hours: 0.06 mole heptafluoroisopropyl allyl ether, 0.06 mole trichlorosilane, 0.2 ml. of 0.14 molar $H_2PtCl_6 \cdot 6H_2O$ in isopropanol.

An 85% yield of the product was obtained—B.P. 39° C. at 0.5 mm. Hg.

*Analysis.*—Calculated for $C_6F_7H_6SiCl_3O$: C, 19.93; H, 1.66. Found: C, 19.50; H, 1.69.

Example B.—Preparation and polymerization of 3-(heptafluoroisopropoxy)propyl-trimethoxysilane Ten grams of the trichlorosilane obtained in Example A were added slowly to a 20% excess of methanol. Dry nitrogen was bubbled through the mixture during the addition to remove HCl. The excess methanol was removed by distillation and the trimethoxy derivative $$Q-O-CH_2-CH_2-CH_2-Si(OCH_3)_3$$

was obtained in a yield of 90%, B.P. 39° C. at 0.5 mm. Hg, $N_D^{22}$ 1.3481.

Example C.—Preparation of 3-(heptafluoroisopropoxy) propylmethyldichlorosilane

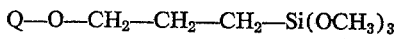
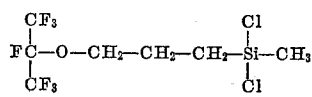

A heavy-walled Pyrex tube, sealed at one end, was dried and charged with 0.035 mole of heptafluoroisopropyl allyl ether, 0.035 mole of methyldichlorosilane, and 0.15 ml. of a 0.14 molar solution of $H_2PtCl_6 \cdot 6H_2O$ in isopropanol. The tube was cooled under nitrogen, evacuated, and melt-sealed. This procedure was repeated until five tubes had been thus prepared. The tubes were placed in a steel cylinder and heated at 80–100° C. for 6 hours. After cooling, the contents of the tubes were combined and distilled. The product (40 g., 71% yield) was obtained as a clear liquid, B.P. 43–45° C. at 1–2 mm. Hg, density at 22° C., 1.4 g./ml., $N_D^{22}$ 1.3652. The proton NMR and IR spectra were in accord with the structure given above.

*Analysis.*—Calculated for $C_7F_7H_9SiCl_2O$: C, 24.64; F, 38.91; H, 2.63. Found: C, 25.07; F, 39.05; H, 2.77.

Example D.—Preparation of 2-(heptafluoroisopropyl) ethyl-trichlorosilane

The compound was prepared by heating the following ingredients in a sealed tube at 90° C. for 6 hours:

0.01 mole heptafluoroisopropyl vinyl ether
0.01 mole trichlorosilane
0.05 ml. of 0.14 molar solution of $H_2PtCl_6 \cdot 6H_2O$ in isopropanol.

An 84% yield of the product was obtained—B.P. 50° C. at 20 mm. Hg.

The intermediates, heptafluoroisopropyl allyl ether and heptafluoroisopropyl vinyl ether, used in the syntheses above are the subjects of our copending applications Ser. No. 433,818, filed Feb. 18, 1965, and Ser. No. 457,533, filed May 20, 1965, respectively. The following examples illustrate the preparation of these intermediates. The expression "diglyme" used below is an abbreviation for the dimethyl ether of diethylene glycol.

Example E.—Preparation of heptafluoroisopropyl allyl ether

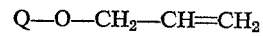

A dry, 250-ml., 3-neck flask was fitted with a Dry-Ice reflux condenser, gas-inlet tube, and magnetic stirring bar. Fifteen and three-tenths grams dry potassium fluoride was placed in the flask, followed by 90 cc. diglyme. This dispersion was cooled to minus 40° C. by applying a Dry-Ice cooling bath to the flask. Forty-four grams of hexafluoroacetone was introduced into the flask. The cooling bath was then removed and the system allowed to come to room temperature. As the system warmed, formation of the fluorocarbinolate

was evidenced by the disappearance of the dispersed KF, giving a homogeneous solution.

Then, 32 grams allyl bromide was added in one batch. The Dry-Ice condenser was replaced with a water condenser and the reaction mixture was heated for 10 hours at 80–90° C. The solid precipitate of potassium bromide was then removed by filtration and the filtrate poured into 250 cc. of cold water. The lower (fluorocarbon) layer was removed and washed three times with 50 cc. portions of water. The crude product was purified by fractional distillation, yielding the allyl ether in a yield of 68%, B.P. 61° C. at 760 mm.

Example F.—Preparation of Heptafluoroisopropyl vinyl ether

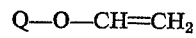

A dry, 500-ml., 3-neck flask was equipped with stirring bar and Dry Ice reflux condenser and then charged with 31.8 g. KF (0.54 mole) and 250 ml. diglyme (the dimethyl ether of diethylene glycol). The flask was then cooled in a Dry Ice acetone bath and 90 g. (0.54 mole) hexafluoroacetone introduced. The contents of the flask was stirred and allowed to come to room temperature as the formation of potassium heptafluoroisopropyl alcoholate took place. After approximately one hour the alcoholate formation was complete, as evidenced by the disappearance of dispersed KF, and a clear solution was obtained. One-hundred and fifty grams (0.8 mole) of 1,2-dibromoethane was then added, in one batch, to the contents of the flask. The Dry Ice condenser was replaced with a water-cooled condenser and the flask was heated at 75° C. for 6 hours. As the reaction progressed, KBr precipitated out of solution. The reaction mixture was poured into three volumes of cold water and the lower fluorocarbon layer collected. This fluorocarbon layer (169 g.) was washed twice with water and dried. It was analyzed with a gas chromatographic unit and found to contain ca. 33% of the desired mono-addition product and approximately 8% of the di-addition product and unreacted starting material. The mono-addition product, 1-bromo-2-heptafluoroisopropoxyethane

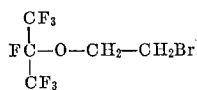

was separated by fractional distillation 30% yield, B.P. 103° C. at 760 mm.; $N_D^{23}$ 1.3360.

In a 3-neck, 100-ml., dry, round-bottom flask, equipped with a condenser, stirring bar, and thermometer, was placed 30 ml. methanol and 15 g. KOH. The mixture was stirred and heated to 90–100° C. Then 10 g. of 1-bromo-2-heptafluoroisopropoxyethane was added over a period of 15 minutes. During the addition, the condenser water was shut off and the condenser was allowed to warm to 40–50° C. to allow for removal of product. The mixture was heated an additional 20 minutes after the addition of the bromo-fluoro-ethane had been completed. The product (6.8 g.) was collected in a Dry Ice trap which was connected to the outlet of the condenser. Distillation of the crude product gave 4 g. of pure vinyl ether, B.P. 29° C. at 760 mm.

Having thus described the invention, what is claimed is:

1. A compound of the structure—

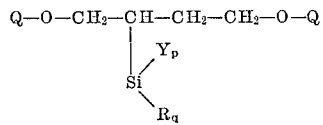

wherein

Q is the perfluoroisopropyl radical,
Y is a member of the group consisting of halogen, alkoxy, aroxy, and acyloxy,
R is a member of the group consisting of hydrogen, monovalent hydrocarbon radicals, and monovalent halo-hydrocarbon radicals,
$p$ is an enteger from 1 to 3,
$q$ is an integer from 0 to 2, and
the sum of $p$ and $q$ is 3.

2. The compound of claim 1 wherein
Y is Cl,
$p$ is 3, and
$q$ is zero.

3. The compound of claim 1 wherein
Y is Cl,
R is $CH_3$,
$p$ is 2, and
$q$ is 1.

4. The compound of claim 1 wherein
Y is methoxy,
$p$ is 3, and
$q$ is zero.

References Cited

UNITED STATES PATENTS

| | | | |
|---|---|---|---|
| 2,920,092 | 1/1960 | Bailey | 260—448.2 |
| 3,012,006 | 12/1961 | Halbrook et al. | 260—448.2 XR |
| 3,038,000 | 6/1962 | Schmidt | 260—448.2 |
| 3,094,497 | 6/1963 | Hyde | 260—448.2 XR |
| 3,132,117 | 5/1964 | Schmidt | 260—448.2 XR |
| 3,331,813 | 7/1967 | Pittman et al. | 260—448.2 XR |
| 3,334,123 | 8/1967 | Calpepper | 260—448.8 |
| 3,362,933 | 1/1968 | Calpepper | 260—448.2 XR |

TOBIAS E. LEVOW, Primary Examiner

J. P. PODGORSKI, Assistant Examiner

U.S. Cl. X.R.

117—121, 161; 260—448.8